(12) United States Patent
Adler

(10) Patent No.: US 9,332,242 B2
(45) Date of Patent: May 3, 2016

(54) DUAL SENSOR IMAGING SYSTEM

(71) Applicant: Gyrus ACMI, Inc., Southborough, MA (US)

(72) Inventor: Doron Adler, Haifa (IL)

(73) Assignee: Gyrus ACMI, Inc., Southborough, MA (US)

( * ) Notice: Subject to any disclaimer, the term of this patent is extended or adjusted under 35 U.S.C. 154(b) by 696 days.

(21) Appl. No.: 13/684,630

(22) Filed: Nov. 26, 2012

(65) Prior Publication Data

US 2014/0146130 A1  May 29, 2014

(51) Int. Cl.
*H04N 13/00* (2006.01)
*H04N 13/02* (2006.01)

(52) U.S. Cl.
CPC ......... *H04N 13/0003* (2013.01); *H04N 13/025* (2013.01)

(58) Field of Classification Search
None
See application file for complete search history.

(56) References Cited

U.S. PATENT DOCUMENTS

| 5,836,869 | A | | 11/1998 | Kudo et al. |
|---|---|---|---|---|
| 5,846,185 | A | * | 12/1998 | Carollo et al. ............... 600/166 |
| 6,036,637 | A | | 3/2000 | Kudo |
| 2005/0128287 | A1 | * | 6/2005 | Hanzawa ....................... 348/42 |
| 2006/0074307 | A1 | | 4/2006 | Igarashi et al. |
| 2006/0206003 | A1 | * | 9/2006 | Hoeg et al. .................... 600/112 |
| 2008/0312499 | A1 | | 12/2008 | Handa et al. |
| 2008/0312500 | A1 | | 12/2008 | Asada et al. |
| 2009/0187073 | A1 | | 7/2009 | Karasawa et al. |
| 2009/0245600 | A1 | * | 10/2009 | Hoffman et al. .............. 382/128 |
| 2009/0299137 | A1 | | 12/2009 | Gal et al. |
| 2010/0010294 | A1 | | 1/2010 | Conlon et al. |
| 2010/0030020 | A1 | * | 2/2010 | Sanders et al. ................ 600/109 |
| 2010/0036199 | A1 | | 2/2010 | Karasawa et al. |
| 2010/0076259 | A1 | | 3/2010 | Asada et al. |
| 2010/0225753 | A1 | | 9/2010 | Karasawa et al. |
| 2011/0046440 | A1 | | 2/2011 | Asada et al. |

(Continued)

FOREIGN PATENT DOCUMENTS

| JP | 2010-069094 A | 4/2010 |
|---|---|---|
| JP | 2011142951 A | 7/2011 |

(Continued)

OTHER PUBLICATIONS

Micron Technology Inc., "1/2-Inch 3-Megapixel CMOS Digital Image Sensor—MT9T001P12STC", Datasheet 2004.

(Continued)

*Primary Examiner* — Michael Teitelbaum
(74) *Attorney, Agent, or Firm* — D. Kligler IP Services Ltd.

(57) ABSTRACT

Medical apparatus consisting of a first imaging device including a first image sensor having a first field of view, and a second imaging device including a second image sensor having a second field of view smaller than the first field of view. The apparatus also includes a processor configured to process a first image acquired by the first image sensor so as to generate a first processed image having a first image magnification, and to process a second image acquired by the second image sensor so as to generate a second processed image having a second image magnification. The processor is also configured to adjust the first image magnification to be equal to the second image magnification so as to form an adjusted first image, and to generate a stereoscopic image based on the adjusted first image and the processed second image.

16 Claims, 8 Drawing Sheets

(56) References Cited

U.S. PATENT DOCUMENTS

2011/0254938 A1 10/2011 Asada et al.
2012/0057001 A1* 3/2012 Morifuji .................. 348/50

FOREIGN PATENT DOCUMENTS

| WO | 9832380 | A1 | 7/1998 |
| WO | 2006063073 | A2 | 6/2006 |
| WO | 2009144729 | A1 | 12/2009 |

OTHER PUBLICATIONS

Aptina Imaging Corporation, "MT9M019: 1/5-Inch 1.3Mp CMOS Digital Image Sensor", Datasheet, year 2006.

* cited by examiner

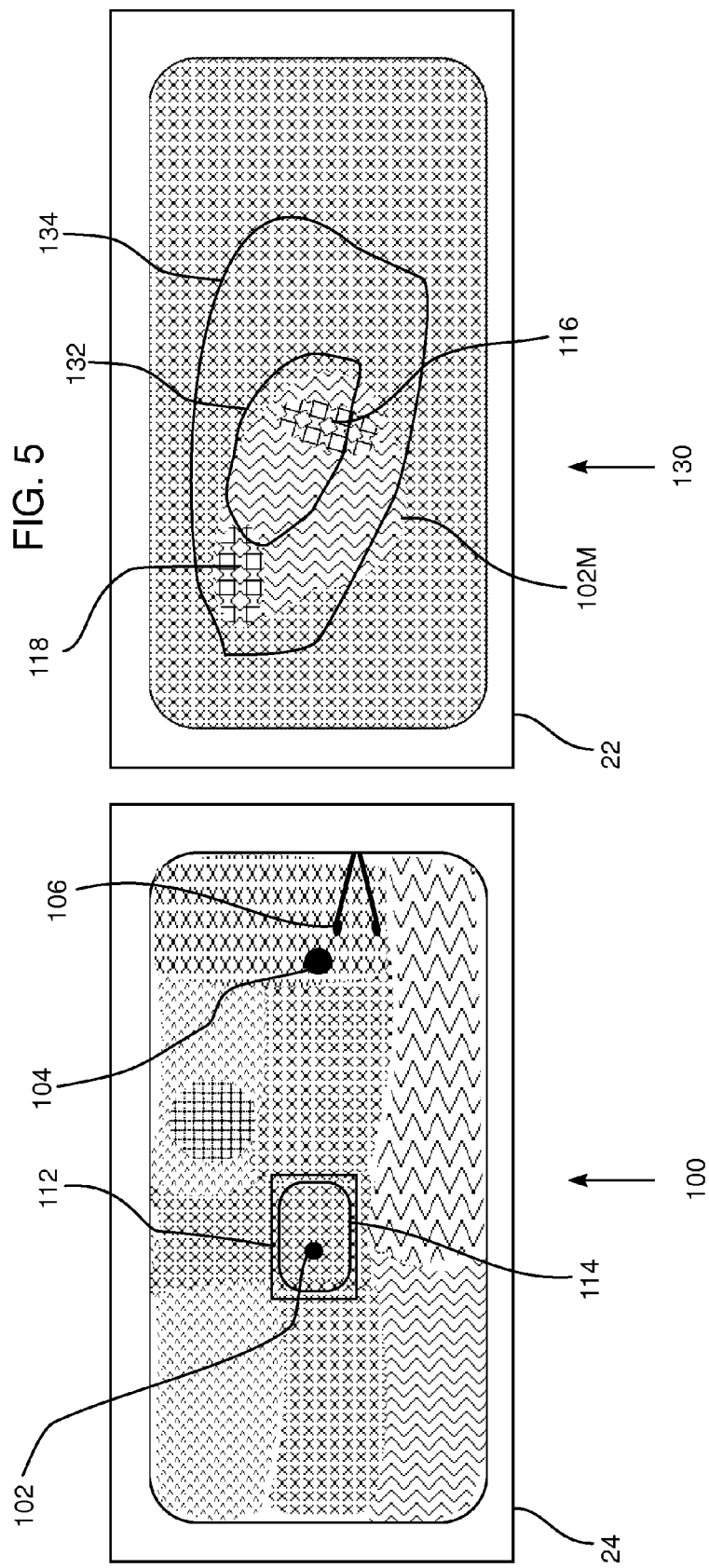

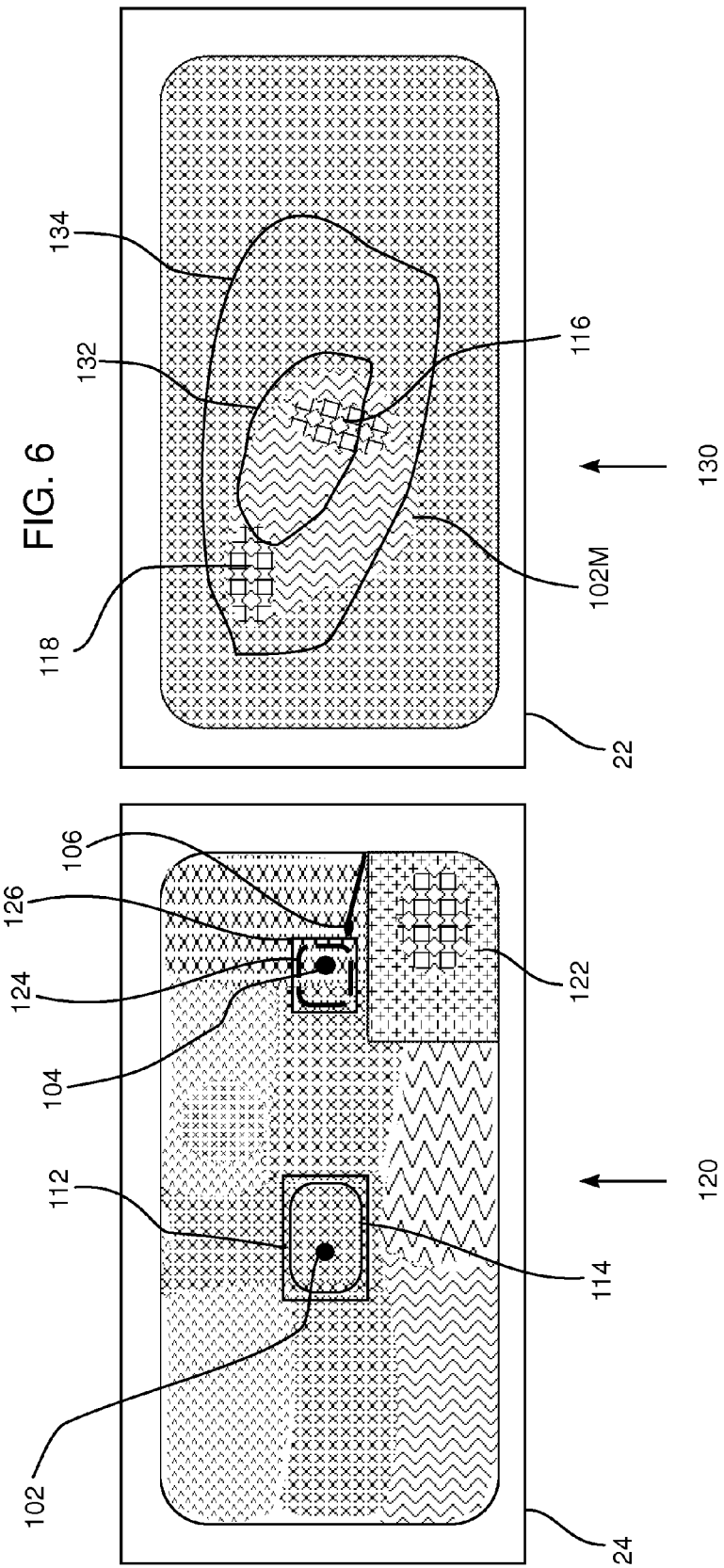

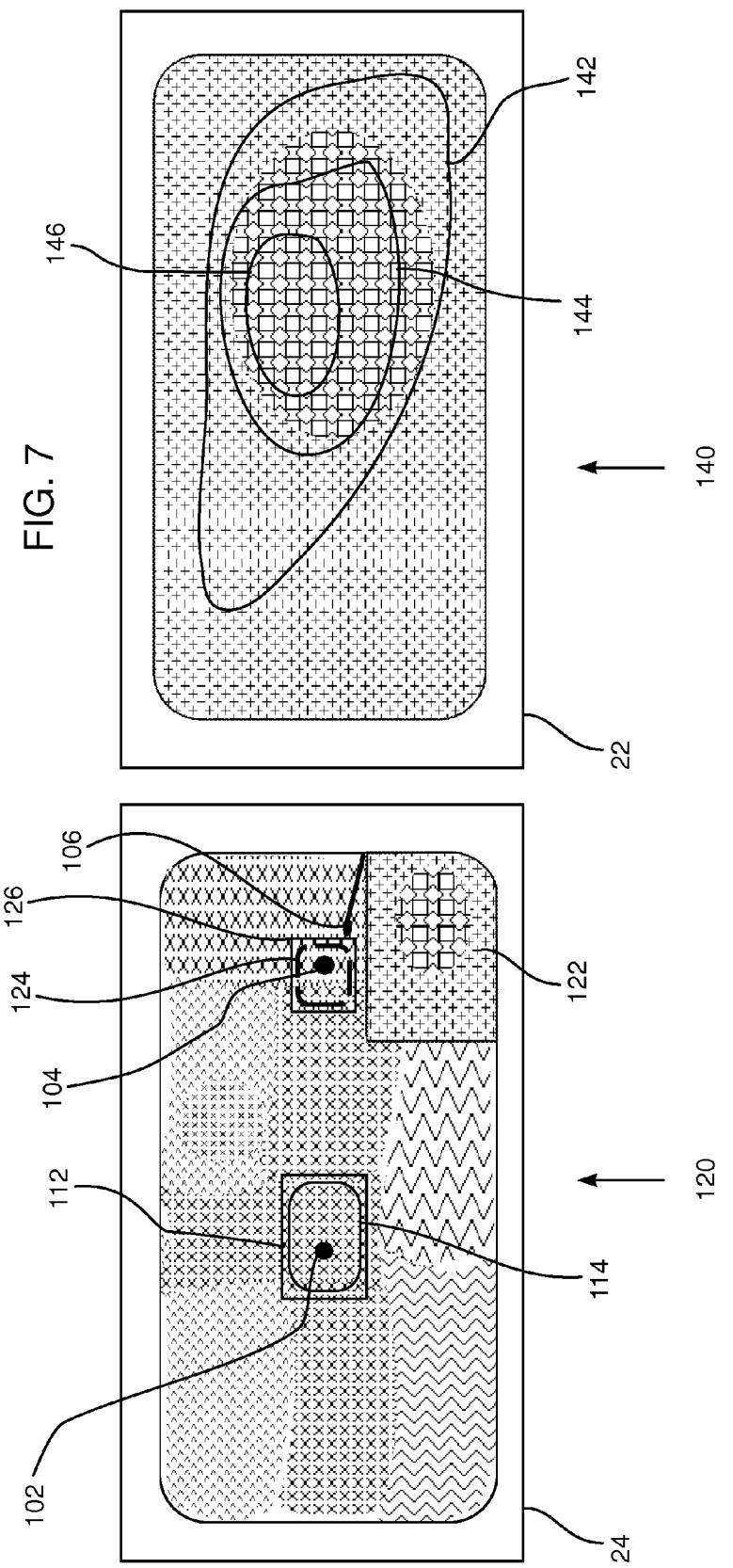

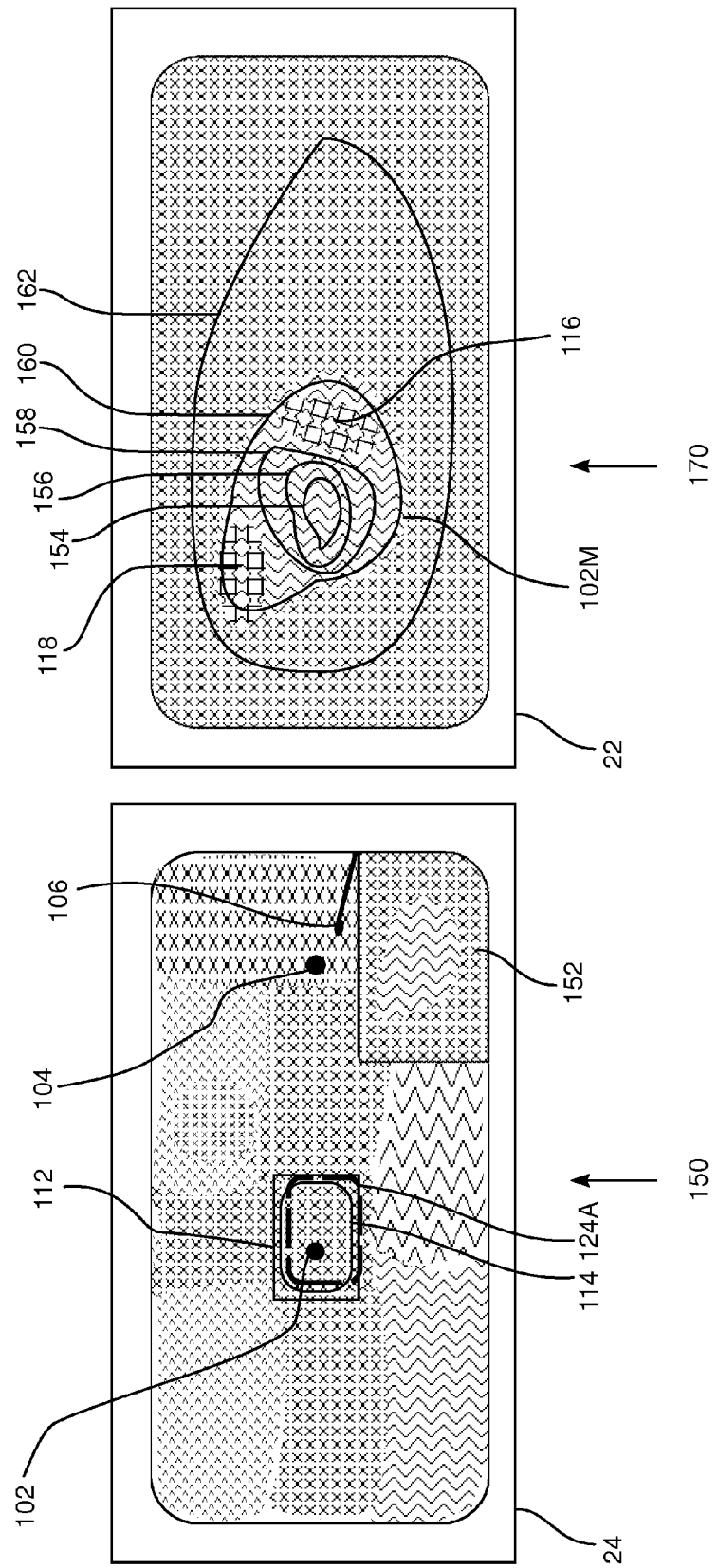

a first imaging device including a first image sensor having a first field of view;
a second imaging device including a second image sensor having a second field of view smaller than the first field of view; and

DUAL SENSOR IMAGING SYSTEM

FIELD OF THE INVENTION

The present invention relates generally to imaging, and specifically to imaging systems that may be used for endoscopy.

BACKGROUND OF THE INVENTION

There is a continuing requirement to increase the quality and efficiency of imaging systems, for example those systems used for endoscopy. Any technique which improves either the efficiency of the imaging, or the quality of the images produced, or both factors, would therefore be advantageous.

Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

SUMMARY OF THE INVENTION

An embodiment of the present invention provides medical apparatus consisting of:

a first imaging device including a first image sensor having a first field of view;

a second imaging device including a second image sensor having a second field of view smaller than the first field of view; and a processor configured to:

process a first image acquired by the first image sensor so as to generate a first processed image having a first image magnification, process a second image acquired by the second image sensor so as to generate a second processed image having a second image magnification, adjust the first image magnification to be equal to the second image magnification so as to form an adjusted first image, and generate a stereoscopic image based on the adjusted first image and the processed second image.

Typically, the processor is configured to adjust the first imaging device and the second imaging device so that the first image and the second image are of a single object.

The first image may be of a sub-section of the first field of view. In a disclosed embodiment, the second image sensor is rotatably mounted on the second imaging device. Typically the processor senses a rotation of the second image sensor and in response to the rotation adjusts dimensional parameters of the sub-section to be equal to dimensional parameters of the second image.

In an alternative embodiment the apparatus includes a tubular member having a proximal end and a distal end configured to enter a body cavity, and the first imaging device and the second imaging device are respectively mounted at first and second locations within the distal end. The first imaging device may be fixedly mounted at the first location, and the second imaging device may be rotatably mounted at the second location. The processor may sense a rotation of the second image sensor and in response to the rotation may adjust dimensional parameters of the sub-section to be equal to dimensional parameters of the second image.

In a further alternative embodiment the first field of view encompasses a panoramic view, and the processor is configured to display the stereoscopic image and the panoramic view simultaneously.

In a yet further alternative embodiment the apparatus includes a touch screen configured to display the first image thereon, and the second image sensor is configured to acquire the second image in response to a touch by an operator of the medical apparatus on a desired portion of the first image.

There is also provided, according to an embodiment of the present invention, apparatus, including:

a tubular member having a proximal end and a distal end configured to enter a body cavity;

a first imaging device, having a first field of view, fixedly positioned at a first location within the distal end;

an orientation stage, fixedly positioned within the distal end so as to define therein a fixed point of rotation at a second location within the distal end, different from the first location;

a second imaging device having a second field of view smaller than the first field of view, the second imaging device being mounted on the orientation stage so as to be rotatable about the fixed point of rotation; and a processor, configured to rotate the second imaging device about the fixed point of rotation so to image a portion of the first field of view.

Typically, the processor is configured to:

acquire a first image of a single object from the first imaging device, acquire a second image of the single object from the second imaging device, and generate a stereoscopic image of the single object based on the first and second images.

There is also provided, according to an embodiment of the present invention, medical apparatus including:

a tubular member having a proximal end and a distal end configured to enter a body cavity;

a first imaging device fixedly mounted at a first location within the distal end, the first imaging device consisting of a first image sensor having a first field of view;

a second imaging device rotatably mounted at a second location within the distal end, the second imaging device consisting of a second image sensor having a second field of view smaller than the first field of view; and a processor configured to:

process a first image acquired by the first image sensor so as to generate a first processed image having a first image magnification, process a second image acquired by the second image sensor so as to generate a second processed image having a second image magnification, adjust the first image magnification to be equal to the second image magnification so as to form an adjusted first image, and generate a stereoscopic image based on the adjusted first image and the processed second image.

There is also provided, according to an embodiment of the present invention, a method for imaging, including:

incorporating a first image sensor having a first field of view in a first imaging device;

incorporating a second image sensor having a second field of view smaller than the first field of view in a second imaging device;

processing a first image acquired by the first image sensor so as to generate a first processed image having a first image magnification;

processing a second image acquired by the second image sensor so as to generate a second processed image having a second image magnification;

adjusting the first image magnification to be equal to the second image magnification so as to form an adjusted first image; and generating a stereoscopic image based on the adjusted first image and the processed second image.

There is also provided, according to an embodiment of the present invention, a method for imaging, including:

configuring a tubular member having a proximal end and a distal end to enter a body cavity;

fixedly positioning a first imaging device, having a first field of view, at a first location within the distal end;

fixedly positioning an orientation stage within the distal end so as to define therein a fixed point of rotation at a second location within the distal end, different from the first location;

mounting a second imaging device, having a second field of view smaller than the first field of view, on the orientation stage so as to be rotatable about the fixed point of rotation; and rotating the second imaging device about the fixed point of rotation so to image a portion of the first field of view.

There is also provided, according to an embodiment of the present invention, a method for imaging, including:

configuring a tubular member having a proximal end and a distal end to enter a body cavity;

fixedly mounting a first imaging device at a first location within the distal end, the first imaging device consisting of a first image sensor having a first field of view;

rotatably mounting a second imaging device at a second location within the distal end, the second imaging device consisting of a second image sensor having a second field of view smaller than the first field of view;

processing a first image acquired by the first image sensor so as to generate a first processed image having a first image magnification;

processing a second image acquired by the second image sensor so as to generate a second processed image having a second image magnification;

adjusting the first image magnification to be equal to the second image magnification so as to form an adjusted first image; and generating a stereoscopic image based on the adjusted first image and the processed second image.

The present invention will be more fully understood from the following detailed description of the embodiments thereof, taken together with the drawings in which:

BRIEF DESCRIPTION OF THE DRAWINGS

FIG. 5 schematically illustrates displays on the screens, according to a further alternative embodiment of the present invention;

FIG. 6 schematically illustrates displays on the screens, according to a yet further alternative embodiment of the present invention;

FIG. 7 schematically illustrates displays on the screens, according to an additional embodiment of the present invention and FIG. 8 schematically illustrates displays on the screens, according to a further additional embodiment of the present invention.

DETAILED DESCRIPTION OF EMBODIMENTS

Overview

An embodiment of the present invention provides a dual sensor imaging system, which is by way of example assumed to be incorporated into the distal end of an endoscope. A first imaging device mounted in the distal end comprises a fixed field of view device, which is typically configured to have a panoramic field of view of an object, such as the wall of a body cavity into which the endoscope has been inserted. A sensor in the first imaging device comprises sensor elements which acquire an image of the panoramic field of view. In addition, a subset of the sensor elements may be configured to acquire, simultaneously, a digitally zoomed image of a first section of the panoramic image of the object. The first section providing the digitally zoomed image may be selected to be substantially any portion of the panoramic image.

A second imaging device of the system has a narrower field of view of the object compared to that of the first imaging device, and the two devices are mounted at different locations in the distal end with parallax. In contrast to the first device, the second imaging device typically generates an optically zoomed image for its narrower field of view. Typically, the second imaging device is mounted on an orientation stage that allows the field of view of the second imaging device to be directed towards a selected second section of the region being imaged.

The first and second sections may be chosen to be of a common region in the panoramic image, and the magnifications of the digitally zoomed image (of the first section) and of the optically zoomed image (of the second section) may be adjusted to be equal. Because the two imaging devices are in different locations in the distal end, the two equal magnification images may therefore be used to generate a stereoscopic image of the common region.

DETAILED DESCRIPTION

Figure 1:
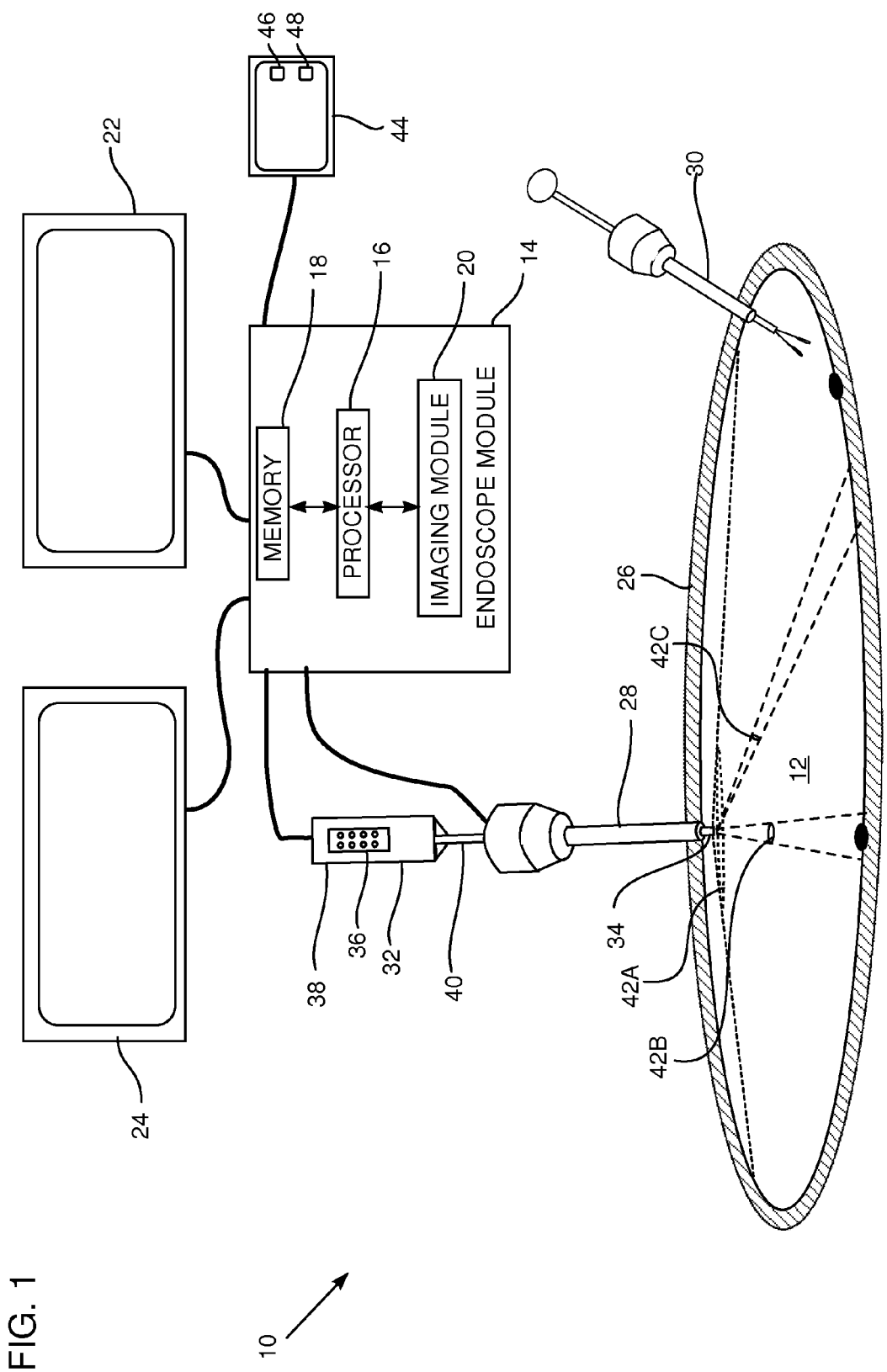
FIG. 1 is a schematic illustration of a dual sensor imaging system, according to an embodiment of the present invention.

Reference is now made to FIG. 1, which is a schematic illustration of a dual sensor imaging system 10, according to an embodiment of the present invention. System 10 may be used in an invasive medical procedure, typically a minimally invasive procedure, on a body cavity 12 of a human patient in order to image entities in the body cavity. By way of example, in the present description the body cavity is assumed to be the abdomen of a patient, and body cavity 12 is also referred to herein as abdomen 12. However, it will be understood that system 10 may be used on substantially any body cavity, such as the bladder or the chest, or in a non-human cavity.

System 10 is controlled by an endoscope module 14, comprising a processor 16 communicating with a memory 18. Endoscope module 14 also comprises an imaging module 20, whose functions are described below, and which may be implemented in software, hardware, or a combination of software and hardware. Endoscope module 14 typically also comprises other modules, such as cavity illumination modules, which may be used by the processor in operating the endoscope module. The processor uses software, typically stored in memory 18, to control system 10. Results of the actions performed by processor 16 may be presented on screens 22 and 24 to an operator, usually a medical physician, of system 10. The screens typically display images of body cavity 12 undergoing the procedure, and/or a graphic user interface, to the operator. The software for operating system 10 may be downloaded to processor 16 in electronic form, over a network, for example, or it may, alternatively or additionally, be provided and/or stored on non-transitory tangible media, such as magnetic, optical, or electronic memory.

To perform a procedure, the operator inserts one or more trocars into abdomen 12 by penetrating an abdomen wall 26. Herein, the operator is assumed to insert a first trocar 28 and a second trocar 30. Once inserted, the operator is able to pass items required for the procedure through respective tubular members of the trocars into abdomen 12. Thus, an endoscope 32, comprising a tubular member 40, may be passed through trocar 28. Endoscope module 14 provides illumination for the endoscope and displays an image acquired by the endoscope on screen 22 and/or screen 24. The operator typically uses the endoscope to view the interior of abdomen 12.

A distal end 34 of tubular member 40 comprises optical elements which enable endoscope 32, together with endoscope module 14, to generate the images acquired by the endoscope. The structure and function of the optical elements are described below with reference to FIG. 2.

In operation of system 10, endoscope 32 is inserted into abdomen 12, and distal end 34 is typically anchored to wall 26 by any convenient method known in the art. U.S. Patent Application 2009/0187073 to Karawasa et al., which is assigned to Olympus Medical Systems Corp., Tokyo and which is incorporated herein by reference, describes a camera which is configured to be internally anchored to the wall of the abdomen. As is explained further below, anchoring the distal end to the abdomen wall enables the endoscope to image virtually all of the abdomen wall. However, in embodiments of the present invention there is no requirement for such anchoring, and in some configurations distal end 34 is not anchored to the wall, but rather is located within the space of abdomen 12. Regardless of the location of distal end 34, imaging devices in the distal end have multiple fields of view, illustrated schematically in the figure by ellipses 42A, 42B, and 42C, and tangent lines to the ellipses subtended from the distal end. The multiple fields of view are described in more detail below.

Endoscope 32 is operated using controls 36, which by way of example are assumed to be located in a handle 38 of the endoscope. Exemplary functions of controls 36 are described below. Alternatively or additionally, the endoscope may be operated by any other convenient system known in the art, such as by a pointing device and/or keypad (not shown in the figure) coupled to module 14. In some embodiments, a touch screen 44 having touch buttons 46, 48 is coupled to module 14, and is configured to allow the operator to perform some of the functions used in system 10. Functions that may be performed using the touch screen and its buttons are described in more detail below.

Figure 2:
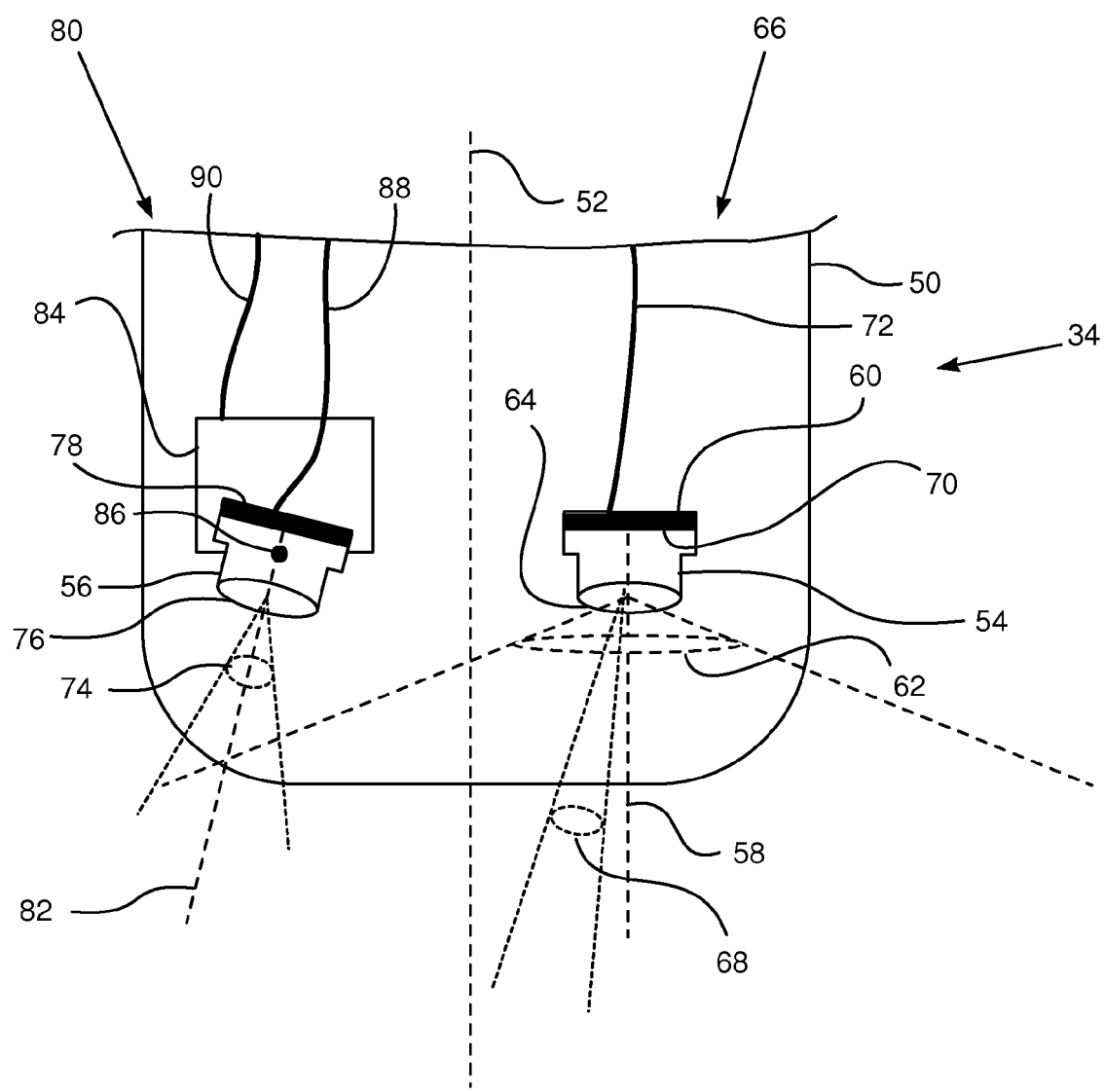
FIG. 2 is a schematic cross-sectional diagram of a distal end of a component of the system, according to an embodiment of the present invention.

FIG. 2 is a schematic cross-sectional diagram of distal end 34, according to an embodiment of the present invention. Distal end 34 comprises an outer transparent housing 50, the housing serving to protect optical elements within the distal end, and to enable light to transmit through the housing. By way of example housing 50 is assumed to be approximately cylindrical, with an axis of symmetry 52. Distal end 34 typically also comprises illuminators, such as LEDs (light emitting diodes), which project light from the distal end so as to illuminate entities being imaged by the optical elements. Alternatively or additionally, illumination for the entities being imaged is provided by illuminators external to distal end 34. For simplicity, the illuminators are not shown in the diagram.

A first imaging device 54 and a second imaging device 56 are mounted within housing 50. First imaging device 54 is typically configured as a panoramic imaging system, and is herein also termed panoramic system 54. Panoramic system 54 is fixedly mounted within housing 50, typically with an optical axis 58 parallel to housing axis 52. The panoramic system comprises an image sensor 60, typically in the form of a rectangular array of sensor elements 66, and herein also referred to as array 60. Assuming that distal end 34 is anchored to wall 26, array 60 is configurable to acquire a panoramic view 62 (corresponding to ellipse 42A of FIG. 1) of substantially all of the wall. The panoramic view is acquired via a fixed focal length lens assembly 64 which typically is designed to have a wide field of view that is conical with a viewing angle of approximately 160°.

In addition, array 60 is also configurable to acquire a relative narrow field of view 68 (corresponding to ellipse 42B of FIG. 1) of a section of wall 26, via lens assembly 64, by sampling a subset 70 of sensor elements 66. The parameters of narrow field of view 68, i.e., its bounds and its direction, may be selected according to the dimensions of subset 70 that are sampled. A suitable array for array 60 is the MT9T001P12STC digital image CMOS sensor produced by Micron Technology Inc., Boise Id., although any other convenient CCD or CMOS image sensor may be used. Typically array 60 may be configured to sample its panoramic view and its narrow field of view substantially simultaneously.

Array 60 is under the overall command of processor 16 (FIG. 1), which, inter alia, is able to demarcate the dimensions of subset 70 that are sampled for the narrow field of view. Typically, commands issued by processor 16 to operate array 60, and to demarcate subset 70, are in response to actions on controls 36 by the operator using the endoscope. Alternatively or additionally, the demarcation of subset 70 may be implemented substantially automatically by processor 16, typically in response to changes detected in the panoramic image or by means of Artificial Intelligence, for example, so as to image a region where a tool trocar or a tool is being inserted or used. The processor typically uses video signals from subset 70 to generate a digitally zoomed magnified image of the narrow field of view.

Signals to and from array 60, including the video signals and a power signal to the array, may be transferred between the array and the processor via a cable 72. Alternatively, at least some of the signals may be transferred between the array and the processor using a wireless system.

In contrast to panoramic system 54, second imaging device is configured to have only a relatively narrow field of view 74 (corresponding to ellipse 42C, FIG. 1), and is herein also termed narrow field system 56. Narrow field system 56 comprises a lens assembly 76, which is typically configured as a variable zoom lens with a large focal depth. Narrow field system 56 comprises an image sensor 78, typically comprising a rectangular array of sensor elements 80, and herein also termed sensor array 78. A suitable sensor is the MT9M019 produced by Micron Technology Inc. System 56 has an optical axis 82, and change of the focal length of lens assembly 76 changes the field of view of the narrow field of view system, while maintaining its direction of view along the optical axis, so that narrow field system 56 is able to generate optically zoomed images for the different fields of view.

Also in contrast to the panoramic system, narrow field system 56 is not fixedly mounted within housing 50. Rather, narrow field system 56 is rotatably mounted on an orientation stage 84 which has two degrees of freedom, i.e. the stage can rotate up-down and left-right. Stage 84 is in turn fixedly mounted within housing 50. Stage 84 is able to rotate the narrow field system, in either or both of its degrees of freedom, about a point 86. A suitable orientation stage for stage 84 is the Edge motor produced by Nanomotion Inc., Ronkonkoma, N.Y. 11779.

As for the panoramic system, narrow field system 56 and orientation stage 84 are under overall command of processor 16, typically using respective cables 88 and 90 which are also configured for signal transfer. Alternatively, at least some of the control and/or signal transfer may be provided using a wireless system. Typically, the dimensions of the field of view, as well as the direction of view, are in response to operations of controls 36. Alternatively or additionally, the dimensions of the field of view and its direction may be implemented by processor 16 substantially automatically, typically in response to changes detected in the panoramic image as exemplified above for the demarcation of array 70.

It will be appreciated that rotation of endoscope 32 about axis 52, together with rotation of narrow field system about point 86, enables system 56 to image substantially all of wall 26, albeit that the images are sections of the wall. Each imaged section is an optically magnified image, generated by the optically zoomed mode operation of narrow field system 56.

Using processor 16, the operator of system 10 may configure the system to provide a number of different displays of the entities being imaged, which in the example described herein is assumed to comprise abdomen walls 26. Displays which may be generated by the system are described with reference to FIGS. 3-5. Except where otherwise indicated, the displays are assumed to be generated on screens 22 and 24.

Figure 3:
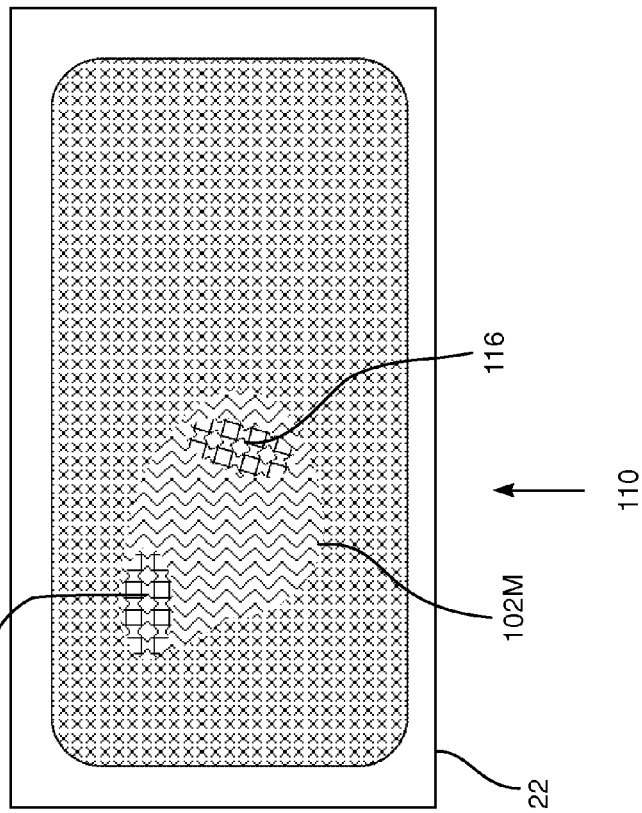
FIG. 3 schematically illustrates displays on screens of the system, according to an embodiment of the present invention.
Figure 3:
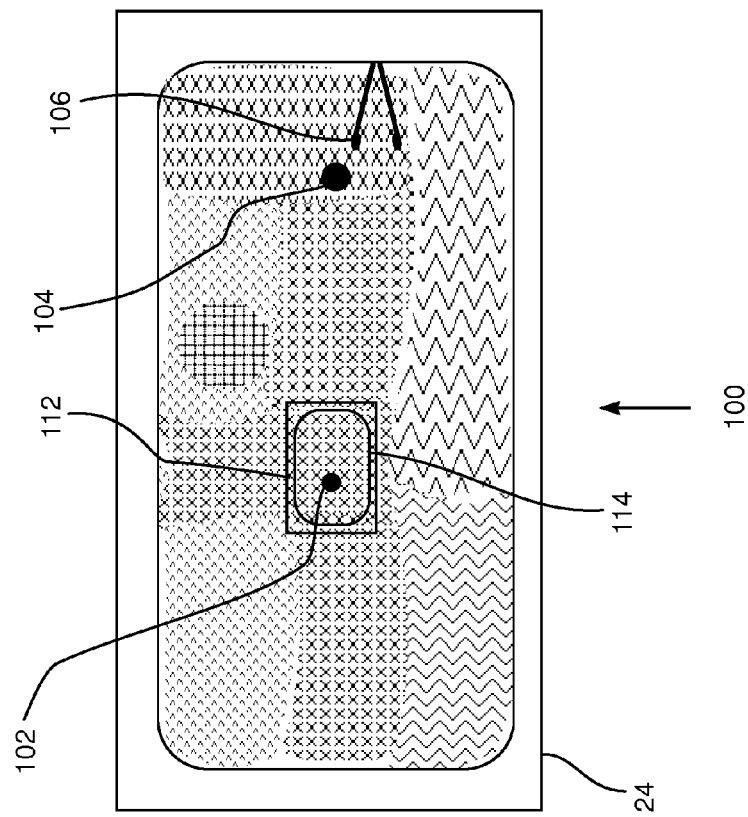

FIG. 3 schematically illustrates displays on screen 22 and screen 24, according to an embodiment of the present invention. Screen 24 has a panoramic image 100 of walls 26, the panoramic image including possible lesions 102 and 104, as well as a distal portion 106 of a tool that has been passed through trocar 30. The panoramic image is generated from panoramic system 54.

Screen 22 has a magnified image 110 of lesion 102 and regions around the lesion. The magnified image includes a magnified image 102M of lesion 102. Magnified image 110 is generated from narrow field system 56, by processor 16 rotating the system about point 86 so that optical axis 82 is directed towards lesion 102. The rotation is typically accomplished using controls 36 of the endoscope. If necessary the system 10 operator rotates endoscope 32 about axis 52. Typically, the operator performs one or both of the rotations while observing the image on screen 22, until a desired image of lesion 102 appears on the screen. Thus, the operator may adjust the field of view of narrow field system 56 to encompass a rectangular region 112 of the panoramic image. The rotation about point 86, and the adjustment of the size of the field of view, may be facilitated by providing a cursor 114 on screen 24. The cursor is configured to indicate dimensional parameters of the field of view being acquired by narrow field system 56, i.e., the size of the field of view and the direction of view of the system with respect to panoramic image 100.

In an alternative embodiment the operator adjusts the size and direction of the field of view of narrow field system using touch screen 44 (FIG. 1). Typically, during the procedure being performed the touch screen may be located in a sterile area. The touch screen is configured to display a panoramic image (corresponding to image 100) generated by panoramic system 54. The operator selects the field of view of narrow field system 56 by touching a desired portion of the panoramic image displayed by the touch screen, the touch causing narrow field system 56 to alter its direction of view accordingly. Typically, touch screen 44 comprises touch buttons 46 and 48, which are configured to respectively zoom in and zoom out the image, magnified image 110, generated by the narrow field system.

Processor 16, under direction from the system operator via controls 36 or touch screen 44, adjusts the field of view of system 56, and consequently the image magnification of the system, by altering a zoom factor of lens assembly 76. Such adjustment may be indicated by changes of dimensions of cursor 114. Because there is no loss of resolution in the optically zoomed image of the lesion, detail of the lesion, such as regions 116 and 118, as well as a more exact shape of the lesion, are visible in the magnified image on screen 22. Such regions may be only poorly visible, or may be completely invisible, in the image of screen 24.

Figure 4:
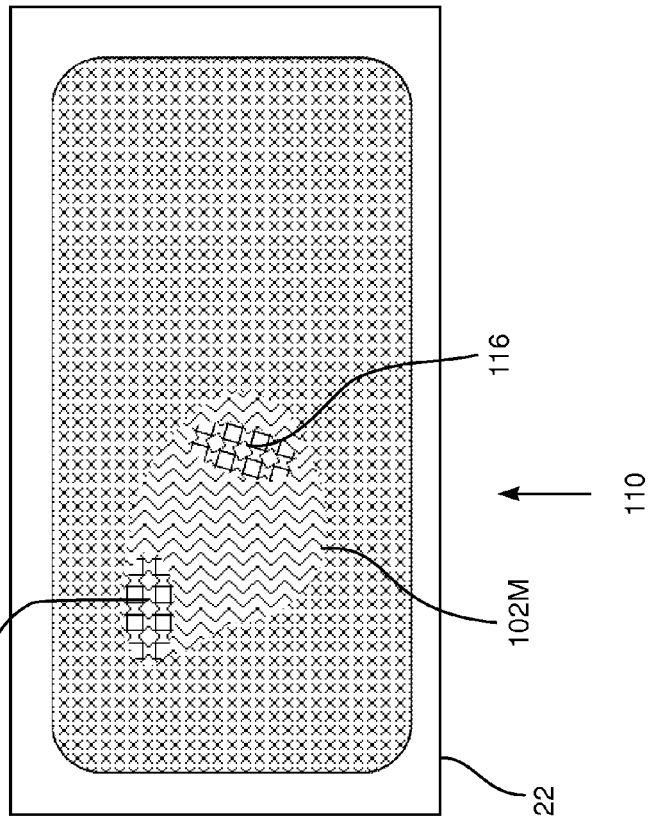
FIG. 4 schematically illustrates displays on the screens, according to an alternative embodiment of the present invention.
Figure 4:
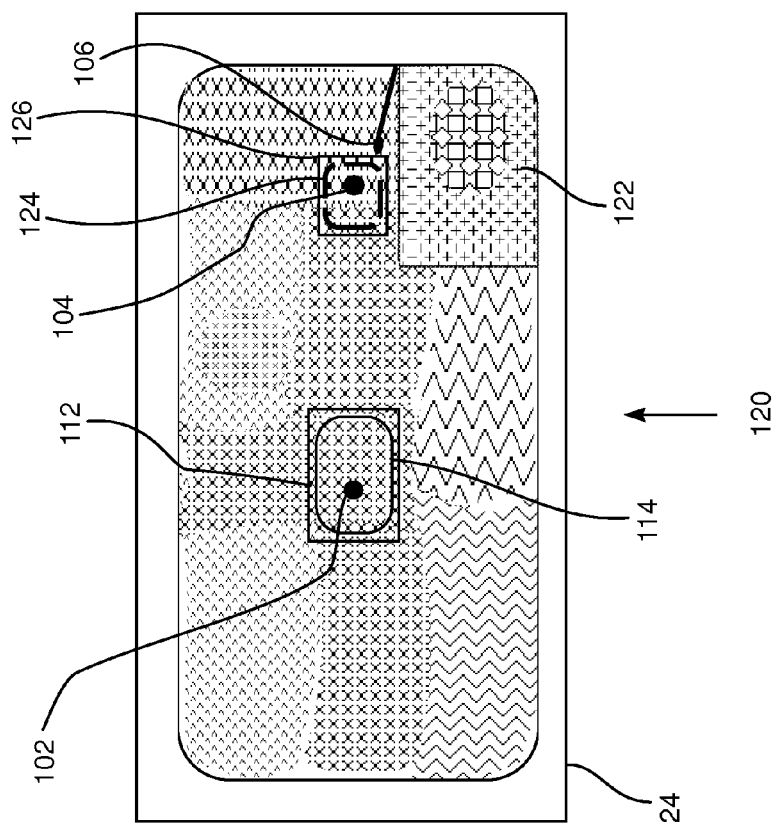

FIG. 4 schematically illustrates displays on screen 22 and screen 24, according to an alternative embodiment of the present invention. Apart from the differences described below, the displays of the two screens in FIG. 4 are generally similar to those illustrated in FIG. 3, and elements indicated by the same reference numerals in both figures are generally similar in properties.

As described above, in addition to providing its panoramic image, panoramic system 54 may be configured to simultaneously provide a digitally zoomed image of a section of the panoramic image formed by the system. In FIG. 4, a panoramic image 120 includes an inset 122 showing such a zoom image. Typically, the system operator uses controls 36, or alternatively touch screen 44 as described above, to set dimensional parameters of a second cursor 124, the parameters being indicative of a region 126 that the operator desires to see as a digitally zoomed image. In the example illustrated, region 126 has been selected to include lesion 104. In addition to using controls 36 or the touch screen to set the dimensions and location of the section to be digitally zoomed, the controls or touch screen may also be used to set a size of inset 122. In other words, the operator may set a magnification factor for the digitally zoomed image. Typically, the operator may also position inset 122 on screen 24 so that the inset does not obscure areas of interest of the panoramic image. In an alternative embodiment, rather than showing the digitally zoomed image as an inset to the panoramic image, the inset may be presented on screen 22 as an inset to magnified image 110. In a further alternative embodiment, the digitally zoomed image may be presented on a third screen (not shown in the figures).

Embodiments of the present invention, in addition to providing optically and/or digitally magnified images of selected regions of a scene, may also be configured to provide stereoscopic images of the selected regions. The stereoscopic images are available because system 10 has two imaging devices, panoramic system 54 and narrow field system 56, which are positioned in different physical locations. There is thus a parallax effect for the two systems, the effect creating differences between the images produced by the systems, and processor 16 may utilize the differences to generate stereoscopic images.

FIGS. 5, 6, 7, and 8, described below, illustrate stereoscopic images that may be produced by system 10.

FIG. 5 schematically illustrates displays on screen 22 and screen 24, according to an embodiment of the present invention. Apart from the differences described below, the displays of the two screens illustrated in FIG. 5 are generally similar to those illustrated in FIG. 3, and elements indicated by the same reference numerals in the two figures are generally similar in properties.

As described above with reference to FIG. 3, magnified image 110 is generated from narrow field system 56. Processor 16 uses the parallax differences between the image from the narrow field system, and the image of rectangular region 112 (around lesion 102) from the panoramic field system, to form a stereoscopic magnified image 130 of region 112. Processor 16 may apply any convenient stereoscopic method known in the art to the differences of the two images, in order to generate stereoscopic, i.e., three-dimensional, contours 132, 134 for region 112. Typically the stereoscopic image uses colors and/or gray-scales to indicate different heights, i.e. contour values, of the region.

FIG. 6 schematically illustrates displays on screen 22 and screen 24, according to an embodiment of the present invention. The displays of the two screens illustrated in FIG. 6 are a combination of those illustrated in FIGS. 4 and 5, and elements indicated by the same reference numerals in the two figures are generally similar in properties.

FIG. 6 illustrates magnified stereoscopic image 130, of the region selected by cursor 114 and described with reference to FIG. 5, on screen 22. Screen 24 presents image 120, described above with reference to FIG. 4, which has inset 122 selected by cursor 124.

FIG. 7 schematically illustrates displays on screen 22 and screen 24, according to an embodiment of the present invention. Apart from the differences described below, the displays of the two screens illustrated in FIG. 7 are generally similar to those illustrated in FIG. 6, and elements indicated by the same reference numerals in the two figures are generally similar in properties.

In the situation illustrated in FIG. 7, rather than magnified stereoscopic image 130 of the region selected by cursor 114 being displayed on screen 22, screen 22 displays a magnified stereoscopic image 140 of region 126 (selected by cursor 124), i.e., image 140 is a magnified image of inset 122. In order to generate image 140, the system 10 operator uses controls 36 or touch screen 44 to indicate to processor 16 that a stereoscopic image of region 126 is required. The processor then orientates narrow field system 56 to image this region. The orientation of system 56 to image region 126 may be by any convenient system known in the art, such as by applying a pattern recognition algorithm to correlate sub-portions of the two images produced.

Using the two images of the region, processor 16 generates stereoscopic, i.e., three-dimensional, contours 142, 144, 146 for region 126, and presents magnified stereoscopic image 140 on screen 22, generally as described above.

FIG. 8 schematically illustrates displays on screen 22 and screen 24, according to an alternative embodiment of the present invention. Apart from the differences described below, the displays of the two screens in FIG. 8 are generally similar to those illustrated in FIG. 3 and FIG. 4, and elements indicated by the same reference numerals in the three figures are generally similar in properties.

In a panoramic image 150, second cursor 124 has been moved, and its dimensional parameters have been adjusted, so that the region of image 150 selected by the second cursor corresponds to the region selected by cursor 114. For clarity, in the figure the illustrations of the two cursors are slightly offset. In addition in FIG. 8, the second cursor is labeled 124A, to clarify that it is in a different position from the second cursor in FIG. 4. Thus, the regions imaged by narrow field system 56 and by the region of panoramic system 54 selected by cursor 124A, i.e., the dimensional parameters of the two regions, correspond. An inset 152 illustrates the digitally zoomed image of the section of image 150 selected by cursor 124A, corresponding to a magnified image of a region around lesion 102.

The operator of system 10 may adjust the two regions to correspond manually, by moving one or both of the two cursors so that they substantially coincide, so that the dimensions of the two regions are substantially the same. Adjusting the dimensions of the two regions to be the same effectively equalizes the magnifications of the digitally zoomed image and of the optically zoomed image. Typically the adjustment may be made using controls 26 or touch screen 44. Alternatively or additionally, the adjustment may be made at least partly automatically by processor 16 selecting the dimensions of one or both regions being imaged. The automatic adjustment may comprise rotation of narrow field system 56 about point 86, and/or alteration of a zoom factor of lens assembly 76.

Typically, regardless of the method for adjustment of the two regions, processor 16 may use any convenient system known in the art, such as the algorithm exemplified above, to correlate sub-portions of the two images produced. As described above, since the images are captured from different viewpoints, i.e., the different physical locations of panoramic system 54 and narrow field system 56, there is typically a difference in the two images. Thus, correlation of the sub-portions of the two images is typically by identifying common features in the two images, such as edges or regions having the same or similar colors and/or intensity levels.

Once the images have been correlated, and since the two images have equal magnifications, processor 16 may apply any convenient stereoscopic method known in the art to the differences of the two images, in order to generate stereoscopic, i.e., three-dimensional, contours 154, 156, 158, 160, 162 for the entity being imaged. Processor 16 produces a stereoscopic image 170 of the region selected by cursors 114 and 124A in image 150 based in the contours. Typically the stereoscopic image uses methods described above to indicate different heights, i.e. contour values, of the entity being imaged.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A medical apparatus comprising:
   a first imaging device comprising a first image sensor having a first field of view;
   a second imaging device comprising a second image sensor having a second field of view smaller than the first field of view; and
   a processor configured to:
      process a first image acquired by the first image sensor so as to generate a first processed image having a first image magnification,
      process a second image acquired by the second image sensor so as to generate a second processed image having a second image magnification,
      adjust the first image magnification by digital zoom of the first processed image to be equal to the second image magnification so as to form an adjusted first image, and generate a stereoscopic image based on the adjusted first image and the processed second image.

2. The medical apparatus according to claim 1, wherein the processor is configured to adjust the first imaging device and the second imaging device so that the first image and the second image are of a single object.

3. The medical apparatus according to claim 2, wherein the first image is of a sub-section of the first field of view.

4. The medical apparatus according to claim 3, wherein the second image sensor is rotatably mounted on the second imaging device.

5. The medical apparatus according to claim 4, wherein the processor senses a rotation of the second image sensor and in response to the rotation adjusts dimensional parameters of the sub-section to be equal to dimensional parameters of the second image.

6. The medical apparatus according to claim 3, and comprising a tubular member having a proximal end and a distal end configured to enter a body cavity, wherein the first imaging device and the second imaging device are respectively mounted at first and second locations within the distal end.

7. The medical apparatus according to claim 6, wherein the first imaging device is fixedly mounted at the first location, and wherein the second imaging device is rotatably mounted at the second location.

8. The medical apparatus according to claim 7, wherein the processor senses a rotation of the second image sensor and in response to the rotation adjusts dimensional parameters of the sub-section to be equal to dimensional parameters of the second image.

9. The medical apparatus according to claim 1, wherein the first field of view encompasses a panoramic view, and wherein the processor is configured to display the stereoscopic image and the panoramic view simultaneously.

10. The medical apparatus according to claim 1, and comprising a touch screen configured to display the first image thereon, and wherein the second image sensor is configured to acquire the second image in response to a touch by an operator of the medical apparatus on a desired portion of the first image.

11. Apparatus, comprising:
a tubular member having a proximal end and a distal end configured to enter a body cavity;
a first imaging device, having a first field of view, fixedly positioned at a first location within the distal end;
an orientation stage, fixedly positioned within the distal end so as to define therein a fixed point of rotation at a second location within the distal end, different from the first location;
a second imaging device having a second field of view smaller than the first field of view, the second imaging device being mounted on the orientation stage so as to be rotatable about the fixed point of rotation while the first imaging device remains fixedly positioned; and
a processor, configured to rotate the second imaging device about the fixed point of rotation so to image a portion of the first field of view.

12. The apparatus according to claim 11, wherein the processor is configured to:
acquire a first image of a single object from the first imaging device,
acquire a second image of the single object from the second imaging device, and
generate a stereoscopic image of the single object based on the first and second images.

13. A medical apparatus comprising:
a tubular member having a proximal end and a distal end configured to enter a body cavity;
a first imaging device fixedly mounted at a first location within the distal end, the first imaging device comprising a first image sensor having a first field of view;
a second imaging device rotatably mounted at a second location within the distal end, the second imaging device comprising a second image sensor having a second field of view smaller than the first field of view; and
a processor configured to:
process a first image acquired by the first image sensor so as to generate a first processed image having a first image magnification,
process a second image acquired by the second image sensor so as to generate a second processed image having a second image magnification,
adjust the first image magnification by digital zoom of the first processed image to be equal to the second image magnification so as to form an adjusted first image, and
generate a stereoscopic image based on the adjusted first image and the processed second image.

14. A method for imaging, comprising:
incorporating a first image sensor having a first field of view in a first imaging device;
incorporating a second image sensor having a second field of view smaller than the first field of view in a second imaging device;
processing a first image acquired by the first image sensor so as to generate a first processed image having a first image magnification;
processing a second image acquired by the second image sensor so as to generate a second processed image having a second image magnification;
adjusting the first image magnification by digital zoom of the first processed image to be equal to the second image magnification so as to form an adjusted first image; and
generating a stereoscopic image based on the adjusted first image and the processed second image.

15. A method for imaging, comprising:
configuring a tubular member having a proximal end and a distal end to enter a body cavity;
fixedly positioning a first imaging device, having a first field of view, at a first location within the distal end;
fixedly positioning an orientation stage within the distal end so as to define therein a fixed point of rotation at a second location within the distal end, different from the first location;
mounting a second imaging device, having a second field of view smaller than the first field of view, on the orientation stage so as to be rotatable about the fixed point of rotation; and
rotating the second imaging device about the fixed point of rotation so to image a portion of the first field of view while the first imaging device remains fixedly positioned.

16. A method for imaging, comprising:
configuring a tubular member having a proximal end and a distal end to enter a body cavity;
fixedly mounting a first imaging device at a first location within the distal end, the first imaging device comprising a first image sensor having a first field of view;
rotatably mounting a second imaging device at a second location within the distal end, the second imaging device comprising a second image sensor having a second field of view smaller than the first field of view;

processing a first image acquired by the first image sensor so as to generate a first processed image having a first image magnification;

processing a second image acquired by the second image sensor so as to generate a second processed image having a second image magnification;

adjusting the first image magnification by digital zoom of the first processed image to be equal to the second image magnification so as to form an adjusted first image; and generating a stereoscopic image based on the adjusted first image and the processed second image.

* * * * *